US006912664B2

(12) United States Patent
Ranganathan et al.

(10) Patent No.: US 6,912,664 B2
(45) Date of Patent: *Jun. 28, 2005

(54) ENERGY-AWARE SOFTWARE-CONTROLLED PLURALITY OF DISPLAYS

(75) Inventors: Parthasarathy Ranganathan, Palo Alto, CA (US); Ramakrishna Anne, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 638 days.

This patent is subject to a terminal disclaimer.

(21) Appl. No.: 10/081,720

(22) Filed: Feb. 21, 2002

(65) Prior Publication Data

US 2003/0156074 A1 Aug. 21, 2003

(51) Int. Cl.$^7$ ................................................ G06F 1/32
(52) U.S. Cl. ........................ 713/320; 713/321; 713/322; 713/323; 713/324; 700/21; 700/22; 345/98; 365/210
(58) Field of Search ................................ 713/300, 320, 713/321, 322, 323, 324; 700/21, 22; 345/98, 212; 365/210, 226, 227, 189.09

(56) References Cited

U.S. PATENT DOCUMENTS

| | | | | | |
|---|---|---|---|---|---|
| 5,557,557 | A | * | 9/1996 | Frantz et al. | 703/22 |
| 5,598,565 | A | * | 1/1997 | Reinhardt | 713/323 |
| 5,619,707 | A | * | 4/1997 | Suboh | 713/322 |
| 5,796,391 | A | * | 8/1998 | Chiu et al. | 345/204 |
| 6,339,417 | B1 | * | 1/2002 | Quanrud | 345/98 |
| 6,345,364 | B1 | * | 2/2002 | Lee | 713/324 |
| 6,772,355 | B2 | * | 8/2004 | Homewood et al. | 713/320 |
| 6,810,482 | B1 | * | 10/2004 | Saxena et al. | 713/320 |

OTHER PUBLICATIONS

Jason Flinn & M. Satyanarayanan, "Energy–aware adaptation for mobile application," Dec. 1999, ©1999 ACM, School of Computer Science, Carnegie Mellon University.
Noboru Kamijoh, Tadanobu Inoue, C. Michael Olsen, M.T. Raghunath, Chandra Narayanaswami, "Energy trade–offs in the IBM Wristwatch computer," ©1999 *IEEE*, pp. 133–140.
Stephen Shankland, "Time to buy IBM's Linux watch?," Mar. 26, 2001, *ZDNet UK News*, "http://news.zdnet.co.uk/story/0,,t269–s2085273,00.html".
Richard Shim, "Toshiba goes organic with new displays," May 31, 2001, *ZDNet UK News*, "http://news.zdnet.co.uk/story/0,,t269–s2087864,00.html".
"Samsung Launches PDA and Mobile Phone Combined," Jul. 19, 2001, *Samsung Electronics Mobile Phone News*, "http://samsungelectronics.com/mobile_phone/product_news/mobile_ . . . ".
Walter S. Mossberg, "Samsung Embeds Cellphone Inside Palm in New I300 Device," Aug. 30, 2001, "http://ptech.wsj.com/archive/ptech–20010830.html".

* cited by examiner

Primary Examiner—Rehana Perveen

(57) ABSTRACT

Energy-aware software control in a computer system requires a plurality of displays. At least two of the displays have diverse attributes that enable reduction in the energy consumption of the computer system. The energy-aware software control involves profiling screen usage patterns and their impact on energy consumption by the displays and in turn by the computer system. The profiling results in an energy model. A determination is made when to activate (or deactivate) the energy-aware software control of the displays in order to decrease their energy consumption. Under the energy-aware software control, and guided by the energy model, a screen fashioned by one or more applications is divided up into sub-screens. Then, the energy needs associated with the sub-screens are matched to particular displays in accordance with their respective attributes and the energy model. The idea is to put the sub-screens on view by matched and likely different displays without significantly diminishing the user experience.

45 Claims, 12 Drawing Sheets

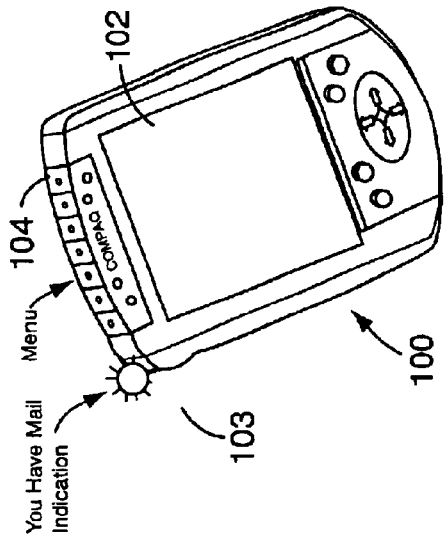
FIG. 1A
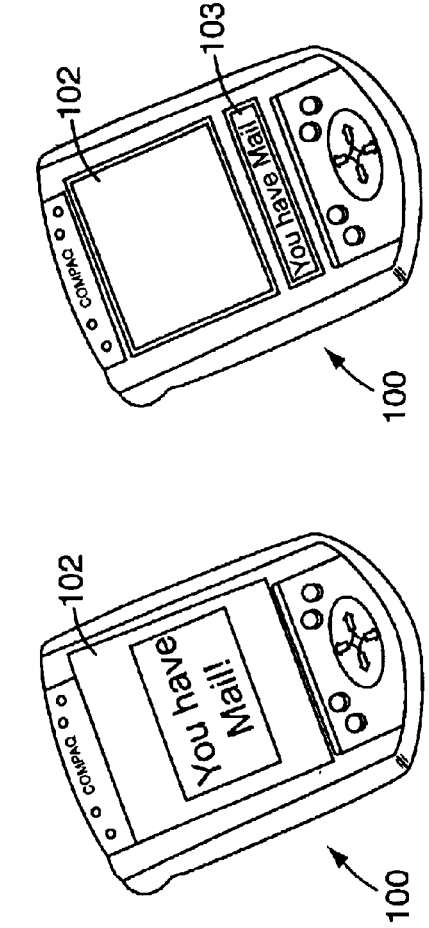
FIG. 1B
FIG. 1C
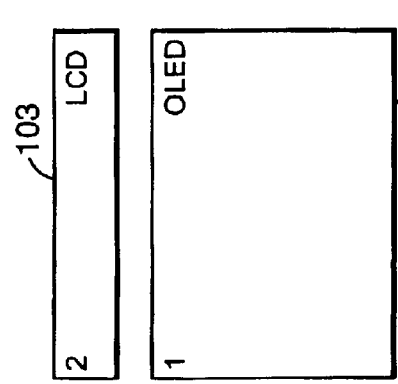
FIG. 1D
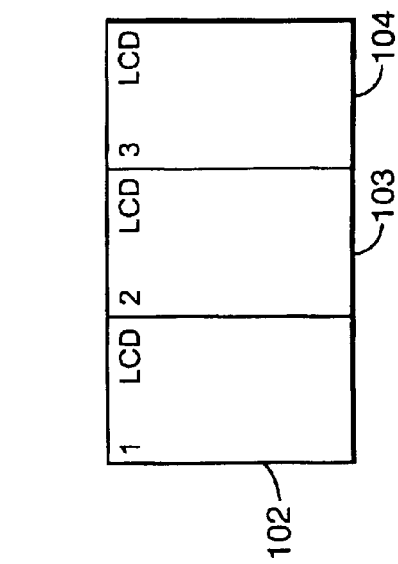
FIG. 1E

ENERGY-AWARE SOFTWARE-CONTROLLED PLURALITY OF DISPLAYS

REFERENCE TO RELATED APPLICATION

This application relates to and incorporates by reference U.S. patent application Ser. No. 10/033,738, Filed Dec. 27, 2001, titled "Software-Directed, Energy-Aware Control of Display."

BACKGROUND OF THE INVENTION

1. Field of the Invention

This application relates to energy savings in computer displays and particularly to energy savings in displays of portable computing systems.

2. Background Art

The challenge of managing energy consumption in computer systems such as desktop computers, servers and the like, is finding efficient ways to conserve electricity. In meeting the energy needs of battery-powered computing systems the challenge is to extend battery life beyond a minimal acceptable duration. Battery life is approximated to the relationship between battery capacity and the average power consumed. Ways to increase battery life include increasing the capacity of batteries. Typically, however, increased capacity translates to larger, heavier and more costly batteries. Moreover, rechargeable batteries in mobile computing devices that are not powered by solar cells or self-winding mechanical devices, hold less energy than non-rechargeable batteries. Thus, whichever power source is used, the design of computing systems must still be biased toward energy conservation.

Energy wise, display subsystems are among the largest consumers of any components in computing systems. A display subsystem is broadly defined as any combination of the hardware and software modules associated with the visual representation of data in a computing system, and is hereafter referred to simply as "display". In particular, each display subsystem includes a display panel (or cathode ray tube—CRT) and in addition it includes a display controller and display drivers corresponding to the display panel technology and an image processing system module. The image processing hardware-software module provides geometry and raster processing. A raster image processor (RIP) is a hardware or combination hardware/software module that converts images described in the form of vector graphics statements into raster graphics images or bitmaps. These modules employ computations to generate each screen. A "screen" is the visual presentation (visible image) fashioned by one or more applications and put on view by a display.

Under normal display usage patterns, battery life in battery-powered devices can be extended with advances in battery technology and low-power circuit designs, including energy efficient displays. However, energy efficiency often comes with less function, or it must be traded off in the design for greater functionality. Thus, without more, such advances may not meet the energy needs of future mobile computing systems with power metrics dominated by normal display usage patterns.

Thus, designs for energy conservation have turned their focus to the patterns of display usage. For instance, devices have been designed with a number of power metrics to decrease the power usage, including power metrics defined by the power consumed in active mode, idle mode, sleep (inactive) mode, and the like. Typically, display usage patterns have been changed by turning the display off or equivalently minimizing the energy usage in the idle and sleep modes.

Another approach proposed reducing the number of pixels to consume less energy. To minimize the number of pixels to be turned on, characters, icons and graphics can be designed with a smaller number of pixels, by reducing font size, etc. However, this approach can impact readability.

To further conserve energy, some approaches have suggested the possibility of zoned backlighting. However, it was believed that design or manufacturing limitations might preclude mass-production of displays that support zoned backlighting.

Another common design involves using smaller displays. However, energy savings with these approaches are limited and invariable once the system is configured. And, no further savings are typically obtained unless the system is reconfigured.

Moreover, these approaches do not take into consideration the varying display real-estate needs of applications and the respective screens-images they fashion. For example, a simple message that indicates "you have mail," "received call 123.456.7890" or "battery low" does not consume a large piece of display real estate. Yet, if the entire display is turned on when generating such message, higher levels of energy are consumed needlessly. Similarly, simple text-based messages may not need full color and a high refresh rate, and providing full color and a high refresh rate consumes unnecessary energy.

It follows that, even with the foregoing approaches, further improvements directed toward energy conservation are needed. The present invention addresses these and related issues.

SUMMARY OF THE INVENTION

The present invention provides an energy-aware approach to display control that involves hardware, including a plurality of displays with varied power properties, and software that exploits this hardware. The idea is to use energy-aware software control in matching the energy needs associated with one or more applications and their respective visual presentations to particular displays from among the plurality of displays.

For instance, when multiple applications are deployed concurrently and fashion respective visual presentations, each visual representation can be associated with a screen. In conventional schemes all these screens would have been combined into a single collective visual presentation (an entire screen) and put on view by a single display. Contrary to conventional schemes, the approach proposed by the present invention involves the energy-aware software control that calls for dividing up the entire screen and matching the energy needs associated with the sub-screens to particular displays from among the plurality of displays. In this case, a sub-screen may correspond to a visual presentation (screen) fashioned by one of the plurality of concurrent applications. That is, the division is along the application lines. The division into and matching the energy needs of sub-screens are based on functional and energy usage considerations. This way, a simple visual presentation such as a text message (e.g., "you have mail") can be designated for (sent to) any one of the displays that is smaller, possibly with black & white or some small color range, that consumes less power.

In some cases, an application fashions a screen with more than one visual presentation (e.g., a menu or tool-bar image, icons image, a work area image and so on) and each such visual presentation can be associated with a portion of the screen. In this case, the energy-aware software control can be further used in matching the energy needs associated with each portion of the screen to a particular display from among the plurality of displays. This way, a screen portion (e.g., menu or tool-bar image) may be appropriately directed to any of the displays that consumes less energy.

Although at times the screen associated with a particular application may occupy the entire screen, it is not always the case. In a case where the screen occupies the entire screen its portions are the sub-screens. Thus, the energy-aware software controls the division of an entire screen into sub-screens all associated with one application (intra-application division) or sub-screens that are individually associated with their respective applications (i.e., inter-application division). In the more complex scenario, the energy-aware software can further control the division into portions of a screen associated with a particular application where the screen is a sub-screen of the entire screen (of the collective visual representation). However, to simplify this discussion, the term "sub-screen" can refer to any fraction of the entire screen resulting from inter-application division, intra-application division or a combination of both (in the more complex case).

Note that the energy savings produced by this approach hold true even when further savings are pursued. For example, further reduction in the energy consumption can be obtained from modifying each sub-screen by controlling the display to which it is assigned under the direction of the energy-aware software control. The additional energy savings are obtained by differentiating between areas of greater interest to the user (areas of focus) on each sub-screen and areas of lesser or no interest (e.g., background). The differentiation involves different energy levels for different portions of the associated display.

In accordance with the present invention, the energy-aware software control coordinates the sub-screen tradeoffs between the various displays and the interaction between the sub-screens. And, apart from the foregoing energy-savings benefits, this feature may enhance the functionality of a computing system with the plurality of displays.

An exemplary system embodying the energy-aware software control includes a central processing unit (CPU), a memory embodying program code to be fetched and executed by the CPU, and a plurality of displays. The program code includes that of applications associated with a screen. The system may further include a user interface including for turning on/off the energy-aware software control. The CPU controls, directly or indirectly, the user interface and the plurality of displays. The system may also include a monitor configured to track power metrics of a power source. Additional system components include an energy model creator using as an input profiling parameters to create an energy model. The energy-aware software control is prompted based on indications from the monitor, applications and/or user interface.

To operate, the present invention requires that two or more of its displays have varied energy properties. Energy attributes vary from display to display based on their size, color and/or gray-scale range, refresh rate, resolution and so on. For example, a small, black & white, low resolution display consumes less power than a high resolution multi-color display. Examples of display technologies include LCD displays technology, organic light emitting diodes (OLEDs) technology, inorganic electroluminescent (EL) display technology, field emission display (FEDs) technology, multi-tiled display technology, multi-modal hierarchy of displays technology, CRT (cathode ray tube) technology, etc.

The energy-aware software control exploits the differences in the energy attributes of the displays as well as the differences in energy needs of the sub-screens. The energy-aware software control includes a mechanism that creates and uses an energy model and aids designers in chosing displays with the proper attributes. In addition, the energy-aware software control includes a mechanism to match the varied energy needs of sub-screens to displays with proper attributes. These mechanisms are likely to vary with the computer systems and applications. Some application may require user-initiated intervention. The energy-aware software includes a further mechanism to determine the nature of control, be it automatic or by user intervention.

Advantages of the invention will be understood by those skilled in the art, in part, from the description that follows. Advantages of the invention will be realized and attained from practice of the invention disclosed herein.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

FIGS. 1A–1E illustrate configurations with multiple displays.

DETAILED DESCRIPTION OF THE INVENTION

Figure 2A:
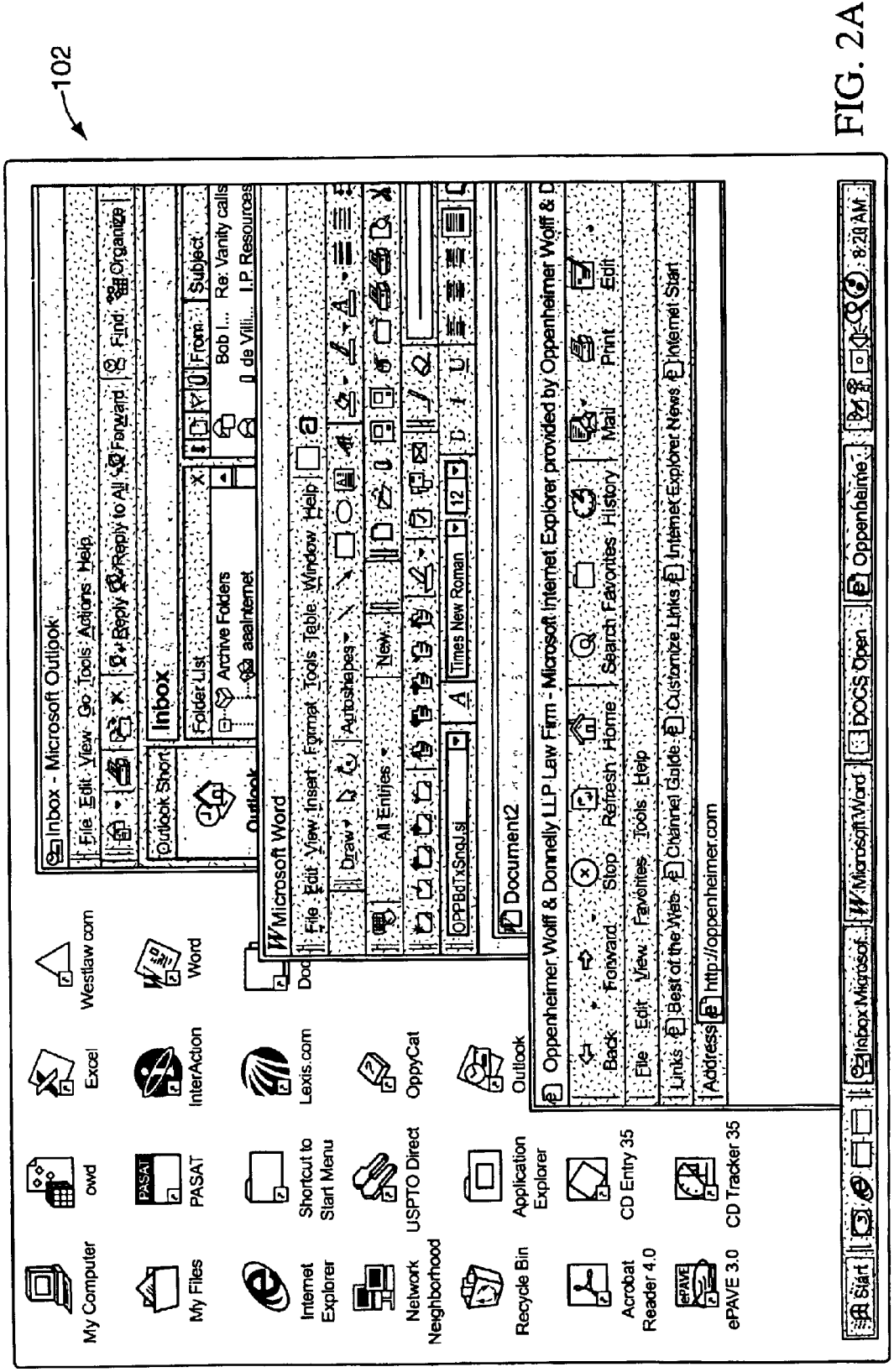
FIG. 2A shows an entire screen containing a collection of visual presentations fashioned by a number of concurrent applications without support for a plurality of displays where the energy-aware software control is deactivated.

The present invention is based, in part, on the observation that energy efficiency has not been a factor considered in prior art software-directed schemes of display control in computing systems. To achieve energy conservation in computing systems, and in battery-powered computer systems to extend the battery life, the present invention proposes changing display hardware design and display usage patterns to reduce the energy consumption of displays. Thus, as a functional and architectural strategy, the invention contemplates a computing system having two or more displays with diverse power attributes and an energy-aware software control for dividing up the entire screen among the two or more displays.

A study of different visual presentations that collectively make up the entire screen shows that they may require different display characteristics (color, size, resolution, brightness, etc.). The idea is to put them on view differently without significantly diminishing the user's experience. To that end, the invention contemplates an energy model that guides the hardware and the energy-aware software control design and operations. Guided by the energy model, the energy-aware software control is designed to match as closely as possible the energy needs of each screen portion (or sub-screen) with a proper display based on its power attributes.

Note that, as mentioned in the previous section, the term "sub-screen" can refer to any fraction of the entire screen resulting from inter-application division, intra-application division or a combination of both. An "entire screen" includes one or more "screens," and a screen does not include more than one entire screen." However, the term "screen" is sometimes used in referring to the entire screen (regardless of the actual number of screens in it) in order to simplify the discussion.

The energy-aware software control is further designed to coordinate the interaction between the sub-screens where the tradeoffs of sub-screens are predefined in the manufacture of the computer system or are selected by the user. In addition, the invention contemplates possible energy-aware software control of the usage patterns of each of the two or more displays. Furthermore, the present invention contemplates the ability to activate and deactivate the energy-aware software control automatically or by user intervention. This approach is intended to provide a practicable and compelling energy conservation and, along the way, to provide extended battery life or reduced consumption of electricity. The way the screen is divided up among the two or more displays and for each display the way these display portions are identified and how their energy consumption can be limited will become evident from the description below.

For any computing environment, it is important to note that, generally, a number of factors control the energy savings benefits which are derived from this invention. One factor is the impact of the energy-aware software control (as a result of dividing up the entire screen into sub-screens and matching the energy needs of the sub-screens with proper displays). This impact needs to be fairly non-intrusive to the entire user experience. In that regard, the sub-screen tradeoffs and interactions between the sub-screens need to be fairly non-intrusive. Another factor is the implementation of the energy-aware software control considering the given system. The implementation of this software control needs to consider system features specific to the particular system design such as the display electronics and potential energy benefits associated with it, as well as the complexity of modifying the software. Yet another factor is the relative properties of the displays in the system and their usage patterns. In order to provide material energy savings benefits, the display usage patterns should be directed to produce close matches between the energy needs of sub-screens and the corresponding displays. A less obvious but important factor associated with the reduced energy consumption is the correlation between the energy-aware software control and the amount of image processing (computations) required for generating the screen. A beneficial correlation is expected between the reduction of image processing—e.g., image geometric and raster processing—and the aforementioned reduction of energy consumption for sub-screens. Under the direction of the energy-aware software control, with the lesser amount of required computations, lower energy consumption can be achieved.

It is further noted that energy conservation is a goal worth pursuing in any system development. Thus, the present invention is not merely focused on the energy needs of mobile computing systems. Rather, the present invention could be likewise implemented in any computing system including desktop systems, high-end computing systems, etc. In other words, energy management can be facilitated by the energy-aware software control in any computing system, be it battery operated or power-supply fed. Under this energy management a system may qualify for a better energy-friendly rating, etc.

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

In accordance with the purpose of the invention as embodied and broadly described herein, energy efficiency is considered a predominant factor in the software-directed scheme of display control in computing systems. Thus, a more profound understanding of the concept of energy-aware software-controlled plurality of displays can be attained from the following description of experiments and an observation of their results. In general terms, the experimentation was intended to show the correlation between screen usage and various factors such as the type of applications, user preferences, system set-up etc. To that end, any computing environment would have been suitable. And, the first order of approximation would have been set up to examine usage of the screen area of interest during regular deployment of such computing environment.

In this case, however, the observations were made while experimenting with a number of desktop computer displays in a windows-based environment. Thus, as first-order approximation, the experimentation was set up to examine the window of focus usage during regular windows-based desktop practice for a test population of five users. The assumption was that the window of focus was the area of interest to the users. A detailed analysis of observed usage patterns, correlating these results to the behavior of users and applications in this particular environment, provides a framework for extrapolating these results to other environments. Moreover, it is important to keep in mind that the experimentation and observations as provided herein for the windowing environment are intended to illustrate and not limit the scope of the present invention and the way it can be exercised. As well, the study of usage patterns for a single display is not intended as a limitation. Rather, this study is instructive in providing a basis for implementing an energy-aware scheme for diving up the screen among two or more displays.

Overall, it appeared from this experimentation that an approach using software control of display usage could have significant promise for energy conservation, thus the motivation for this invention. Indeed, it appeared possible that, on average, battery life could be doubled if, for example, the size of a screen fashioned by an application would be matched with a properly sized display.

In setting up the experiment, the focus was on determining the impact of display size, although controlling features such as color, refresh rate, resolution, etc. could have been equally applicable in this context. The user displays are characterized as follows:

| User | Display Type | Display Resolution | Screen-Saver (minutes) |
|---|---|---|---|
| user 1 | 19" CRT | 1024 × 768 | 15 |
| user 2 | 21" CRT | 1280 × 1024 | 10 |
| user 3 | 19" Flat Panel | 1280 × 1024 | 2 |
| user 5 | 19" Flat Panel | 1280 × 1024 | 4 |
| user 5 | 19" Flat Panel | 1280 × 1024 | 15 |

From this table it can be seen that the study was based on desktop usage of the Microsoft Windows environment by 5 users where the users and their computing systems are representative of a typical range of users, systems and workloads. The workloads included for example software development applications, productivity applications, connectivity applications, etc. An application-level logger program was executed on the users' machines to profile each of them. The logger program was used to collect periodic information about (i) the current window of focus—its size, its location, and its title and (ii) the size of total screen area used (all non-minimized windows). The logging period was set to the minimum possible (one second). Simple privacy protection heuristics, were applied to mask out personal information in e-mail, calendar, appointment, contacts, task, web browser and other applications. Users were requested to set the properties of their screen savers to turn on after a reasonable time (1–15 minutes). This helped reduce the errors associated with monitoring the usage patterns when the user was not active.

The logger programs ran from 1 to 14 days and about 200,000 to 1,250,000 samples were taken. Given that the samples were taken every second, this represents a total of close to 55 days of computer usage time. The profiling included the times in which the users were idle. The time spent in the screen saver mode was used as an indication of when a user was idle, and samples were collected during the time threshold it took for the screen saver to be activated. However, this was not expected to change the results qualitatively. Factoring out the time spent in the screen saver, the active-user log sizes range from about 96,000 to about 220,000 samples; or approximately 27 to 61 hours of computer usage per user.

The next table summarizes the results for the forgoing test setup as follows:

| | | | Screen Usage for Active Samples | | | |
|---|---|---|---|---|---|---|
| User | Logged Samples | Active Samples | Mean for Window of Focus (%) | Standard Deviation (%) | Mean other windows (%) | Standard Deviation (%) |
| user 1 | 754,938 | 11,720 (32.7 hrs) | 62.8 | 38.5 | 10.6 | 21.2 |
| user 2 | 1,244,843 | 218,744 (60.7 hrs) | 57.2 | 22.3 | 11.6 | 28.5 |
| user 3 | 769,466 | 111,741 (31.0 hrs) | 46.3 | 19.7 | 30.4 | 19.7 |
| user 5 | 229,990 | 155,677 (43.2 hrs) | 36.7 | 14.5 | 34.1 | 8.8 |
| user 5 | 911,786 | 96,267 (26.7 hrs) | 43.2 | 22.7 | 32.6 | 21.1 |

The average screen usage for the window of focus: 59.2%
The average screen usage for background windows: 33.0%

The table includes the total number of samples and the number of active samples collected per user (columns 2 and 3). Additionally, this table includes information about the screen usage averaged across all the active samples. Columns 4 and 5 present the mean and standard deviation for the screen usage of the window of focus. Columns 6 and 7 present the mean and standard deviation for the additional screen area used by other non-minimized windows in the system. Logged samples, refers to the total samples collected. Active samples, refers to the samples collected when the screen saver was not active. A consideration was given to the fact that the percentage of screen usage varied significantly over the time the samples were collected, all the way from near-0 to near-100%. Also noticed were the increased clustering of points at specific screen-usage percentages, and this clustering can be correlated back to the key applications used by the users and their normal (or default) window sizes.

As can be seen from the table, screen usage for windows of focus involved only a screen area of 37% to 63% of the entire screen area. Screen usage for background windows that were not active but were not minimized involved a screen area of about 10% to 57%. Thus, on average, only about 50% of the entire screen area was used for the main window of focus. This can potentially translate to an extended battery life by a factor of two if the window is matched (size wise) with a proper display. On average, an additional 32% of the screen is used in background windows that are not minimized. Thus, even when assuming that these windows are important to the user experience, energy-aware software control of the display can potentially yield 18% improvements in the energy consumption of the display. In both these cases, however, the standard deviations are fairly high indicating a wide range in the screen usage values associated with each sample.

Summarizing the results from the samples, it was further observed that for the 5-user population, 26–87% of the samples use less than 30% of the entire screen area; 31–92% of the samples use less than 50% of the entire screen area; and 56–98% of the samples use less than 75% of the entire screen area. On average, for almost 60% of the time, less than half the entire screen area was used. This is particularly interesting since this means that for more than half the time there is the potential for conserving close to half the energy spent on the display.

Then, in order to understand the relationship between the screen usage and application behavior, samples from the 5-user profiling logs were combined and allocated to four bins. Broadly, the applications can be informally categorized as (i) access-related—web browsing and e-mail, (ii) personal productivity and code development, and (iii) system-related and application-control windows applications. For each bin, the dominating applications associated with the samples were analyzed. Overall, the various types of applications appear to have been used in a characteristic way to such environments. The bins are characterized by: (i) samples where the window-of-focus usage was between 0 and 25% of the total screen area, (ii) samples where the window-of-focus usage was between 25% and 50%, (iii) samples where the window-of-focus usage was between 50% and 75%, and (iv) samples where the window-of-focus usage was between 75% and 100%. The relationships between the screen usage and application behavior are put into a table as follows:

| | |
|---|---|
| Window size 0–25% of the entire screen area | Number of samples: 103,031<br>Dominant applications: 36% Task bar, 28% X-term, 9% Program Manager, 5% Message-Compose, 23% Miscellaneous system messages (properties windows, message, volume control, active sync, file downloads, alarms and alerts, printer status, find-and-replace, organizer preferences, spell-check, real-player, wizards, status messages, file-find, password query windows, confirmation windows) |
| Window size 26–50% of the entire screen area | Number of samples: 275,350<br>Dominant applications: 59% X-term, 11% Message-Compose, 11% Outlook, 7% Pachyderm, 22% Miscellaneous windows (mail-related windows, Internet Explorer, MS Word, Emacs, Window explorer and file navigation, Dreamweaver, Powerpoint) |
| Window size 51–75% of the entire screen area | Number of samples: 202,093<br>Dominant applications: 76% Internet Explorer, 5% Message-Compose, 3% Netscape, 17% Miscellaneous windows (Microsoft word, Emacs, and Acrobat reader, Powerpoint, Outlook, Pachyderm, Dreamweaver, Excel, Windows explorer and file navigation, WinLogger) |
| Window size 76–100% of the entire screen area | Number of samples: 119,675<br>Dominant applications: 25% Internet Explorer, 21% Outlook, 5% Visual C++, 5% Excel, 3% DirectX, 53% Miscellaneous windows (Microsoft Word, Excel, Visual C++, Powerpoint, Dreamweaver, Imageviewer) |

In focussing on the size of the windows associated with the various applications, a number of trends were observed. The study of these trends is particularly instructive for implementing an energy-aware software control of the multiple displays in accordance with the present invention. One observed trend can be characterized in that status messages and query windows appeared to typically use small window sizes; and these windows, in fact, constituted a significant fraction of the samples associated with smaller size windows. Another observed trend can be characterized in that personal-productivity applications, development applications and web-browsing and e-mail applications appeared to typically use larger portions of the entire screen area. Moreover, the portions of used screen area appeared to be somewhat dependent on individual user preferences for window size, fonts, etc. For example, smaller font sizes can translate into smaller window sizes. It was further observed that user preferences and pre-set defaults tend to influence the overall screen usage characteristics. For example, User 1, who used 63% of the display area, had an Internet web browser set to use 96% of the screen area. By comparison, User 5, who used on average 37% of the display area, had an Internet web browser set to use 67% of the display area.

Such user-specific window sizing appeared to be particularly characteristic of web browsing, email, and editor applications. In contrast, for development applications, most of the users preferred to have larger windows—possibly because of the multi-window content structure of these applications. (Note however that multi-window contents are typically characterized in that each window may require different display properties and thus multi-windows content are well suited for multiple displays.) Similarly, system-related and application-control messages typically appear to use smaller windows irrespective of the user. This is so mainly because of the relatively small content in these windows and in most cases the window sizes are pre-determined by the application.

As to the influence of display resolution, insufficient sample points have been collected to make an exact correlation between display resolution and its impact on screen usage. General experience suggests that different applications require different display attributes such as resolution. For instance, as compared with a messaging application or the like, a video-conferencing application may need higher resolution, as well as larger screen area, broader color range and higher refresh rate. Therefore, images associated with video-conferencing would lead to higher energy consumption as compared with smaller less complex images.

In sum, the results of the experimentation with desktop systems show that, on average, only 37%–63% of the entire screen area was used. As indicated before, such usage patterns can be exploited to produce substantial energy savings and in mobile computing systems material extension of battery life. Hence, a display control paradigm that entails energy-aware matching between screen portions (or sub-screens) and displays based on their attributes can achieve significant energy conservation. Although this study focused primarily on matching between sub-screen sizes and the size of displays, energy-aware matching based on other and/or additional display attributes is believed to produce energy savings of like magnitude or better. It is also important to note that although this user study was performed on desktop systems and display usage patterns may be different in mobile computing systems, the results of energy savings in mobile computing systems can be nonetheless profound and material.

Having demonstrated that energy aware software control of displays is a promising energy saving solution, the discussion that follows introduces the ways this solution can be implemented as well as various implementation issues. This solution requires a software program product and a hardware product including two or more displays that can support the functionality controlled by the software program. The energy-aware software control takes into consideration the varying attributes of the displays, particularly their power consumption characteristics. In that regard, an important component of this solution and a starting point for the energy-aware software control is an energy model that profiles screen usage for various applications under normal deployment conditions. Based on this information and the energy model, a number of decisions can be made including when and how to use the multiple displays and how to partition the screen. The energy model guides design choices such as the system architecture, the number of displays with which the system is configured, their particular technology type (e.g., LCD, OELD, etc.) and their attributes.

Examples of configurations with multiple displays are shown in FIGS. 1A through 1E. It is noted that although a system need not be configured with any particular hierarchy of the multiple displays, the displays can be configured in a hierarchical order based on their attributes, functionality or both. In such hierarchy, for example, a relatively large high-resolution color display may be considered a primary display and other smaller displays may be secondary. To simplify the discussion, however, the examples that follow do not address any particular hierarchy. In FIG. 1A, only one display 102 is used when the user prefers to turn off the energy-aware software control. In FIGS. 1B through 1E, the system is configured with a first display, second display, and so on (e.g., 102, 103, etc.), and all of them are controlled by the energy-aware software. In this configuration, the first display is a relatively large color display and the second, third and other displays may be smaller monochrome or limited color displays. Namely, the displays have diverse attributes. The configuration of multiple displays in FIG. 1C, includes the first and second displays 102 and 104 as well as an indicator 103 (e.g., LED or LCD display). The multiple displays in FIG. 1D are configured with one panel such as a tiled display panel, where each tile 102, 103 & 104 can be assigned to a particular sub-screen based on energy consumption and functionality criteria. The multiple displays in FIG. 1E, include three, or optionally four, display panels 102, 103, 104 & 105. The LCD or OLED panel 102 will likely be the main panel and the others secondary panels.

Thus, the plurality of displays can be used in several ways depending, in part, on the computing system and the context in which the displays are used. Although not exhaustive, the following examples describe ways the plurality of displays can be used. In the context of a handheld computer with integrated cell-phone functionality, two unequal displays can be implemented where the screen is divided up among them. The smaller display can be used for any sub-screen that contains battery status messages, signal strength and the like. The smaller display can be also used for SMS (short message service) that is a service for sending messages to mobile phones. The larger display can be used for sub-screens associated with regular computing environment deployment. To that end, the larger display is a high-resolution color display and the smaller display is comparatively a low-resolution monochrome display. The division into the sub-screens is based on functionality and energy considerations. Whenever practicable, sub-screens are directed to the smaller lower-power-consuming display rather than the larger display. And the decision can be made on an application-by-application basis through software control or user intervention.

In another context, the smaller second display, or even a third display, can be used for two-way paging, ticker-tape-information scrolling, MP3 titles, or any other suitable contents. (MP3, which stands for MPEG-1 Audio Layer-3, is a standard technology and format for compressing a sound sequence into a very small file while preserving the original level of sound quality when it is played). The distribution of contents among the two or three displays considers the particulars of each display attributes.

In yet another context, the smaller second or third displays can be used to supplement the contents and/or functionality provided by the larger display. For example, menus, tool bars, or soft keys can become sub-screens and be moved to a smaller second or third display while the other images produced by applications can be maintained as a "main" sub-screen and assigned to the larger display. In dividing up the screen into the various sub-screens and keeping the main sub-screen assigned to the larger color display the overall user experience can be enhanced, in that the main sub-screen is uncluttered. In a desktop system that is implemented for example with a tiled-display technology, the sub-screens can be divided up among the tiles to fit the user preference and energy criteria.

Moreover, the physical configuration of the multiple displays can be adjusted to fit the physical attributes of the computer system. Thus, for example, a hand-held device may be fitted with two or more displays where each display is sized to fit a particular dimension (depth, width, length or height) of the device. Namely, the hand-held device can be fitted with a primary display for its face and a secondary or even third display for any one of its sides, back, top, or bottom surface. The location of displays can be designed for ease of access and viewing.

Figure 2B:
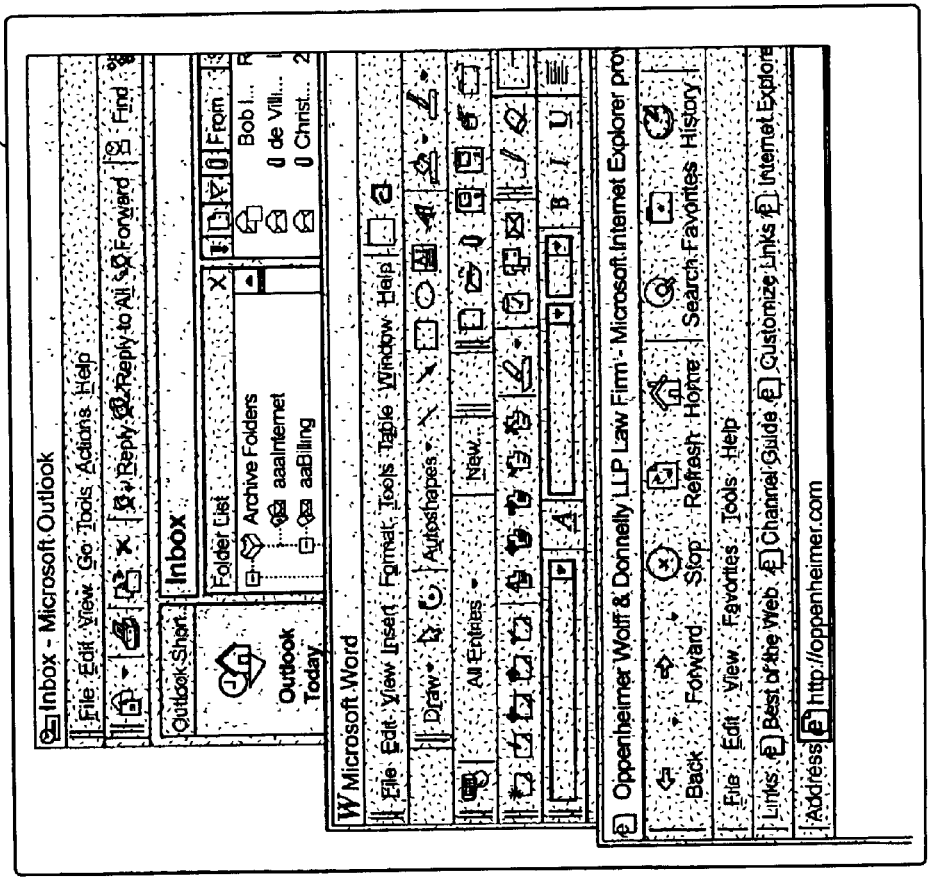
FIG. 2B shows the entire screen of FIG. 2A divided into sub-screens that are allocated to displays based on their respective energy needs and functionality under the control of the energy-aware software.
Figure 2B:
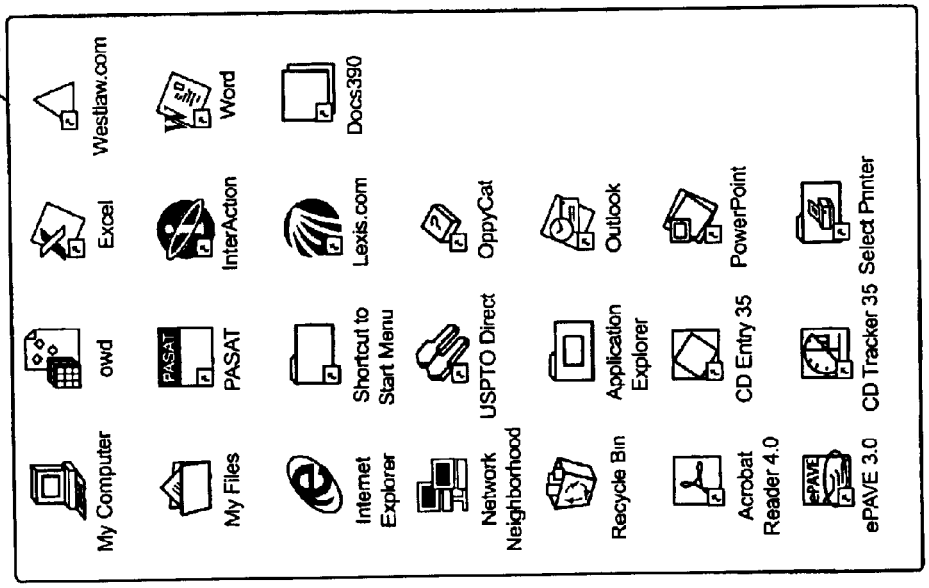
Figure 2B:

Considering the various design possibilities, the thrust of this invention is energy-aware software control over the screen partitioning, sub-screens tradeoffs and interactions as well as over usage patterns associated with each display. To illustrate the impact of these aspects, FIG. 2A shows an entire screen containing a collection of visual presentations (e.g., tool bars and windows in a windowing environment) fashioned by a number of concurrent applications with the energy-aware software control deactivated. FIG. 2B, shows the entire screen of FIG. 2A divided into sub-screens that are allocated to corresponding displays 103 and 104 under the control of the energy-aware software. In this example, sub-screens containing tool bars and icons are respectively diverted to smaller displays based on functionality and display parameters (size, color) that better match the energy needs of the sub-screens. The sub-screen containing visual presentations (e.g., windows) of the multiple concurrent applications is designated for the larger color display 102. It is important to note that the division into sub-screens as shown in FIG. 2B is merely exemplary and that the entire screen can be divided in other ways based on functionality or energy consideration.

Figure 3A:
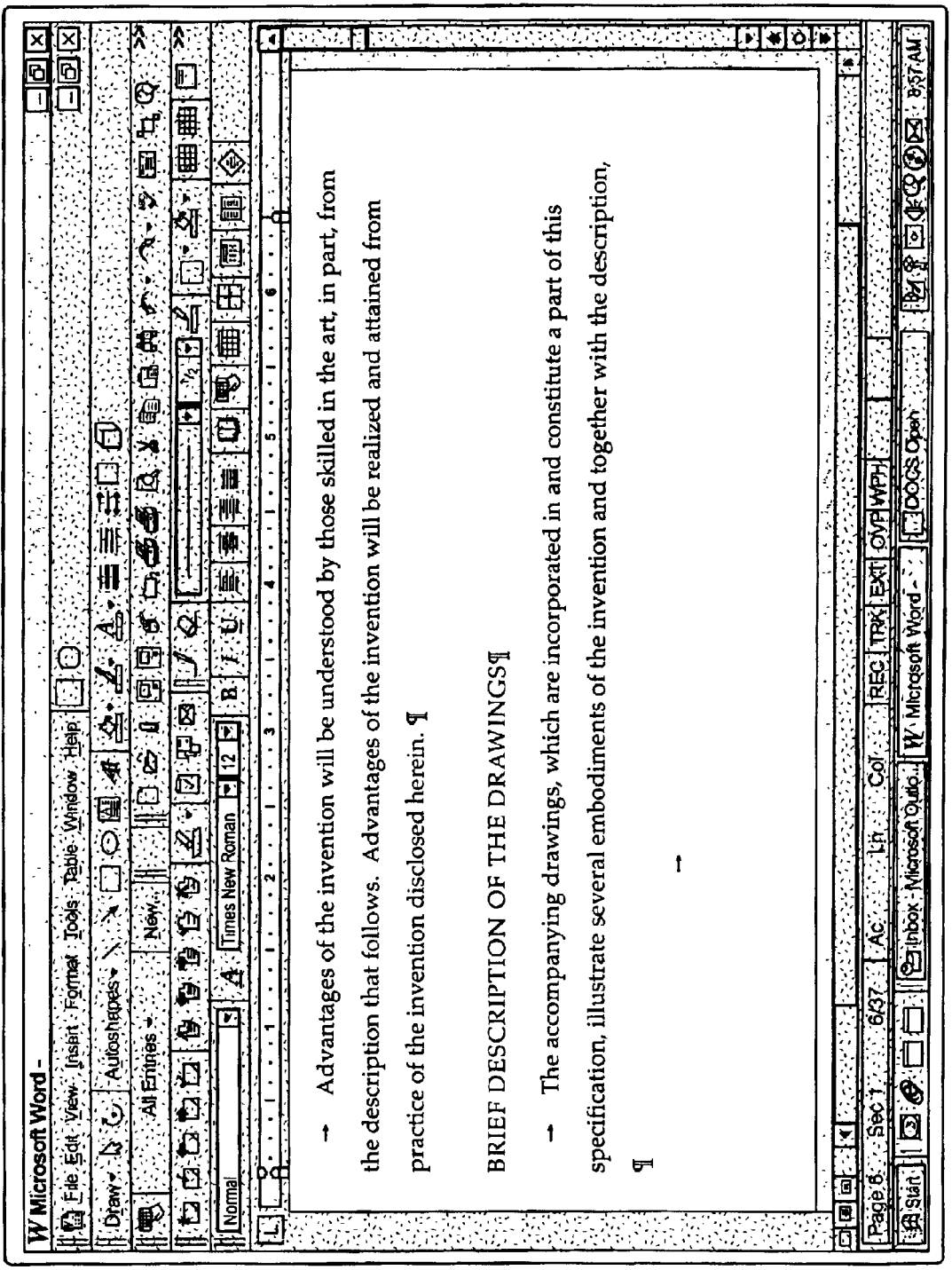
FIG. 3A shows a visual presentation fashioned by an application that occupies the entire screen without support for a plurality of displays where the energy-aware software control is deactivated.
Figure 3B:
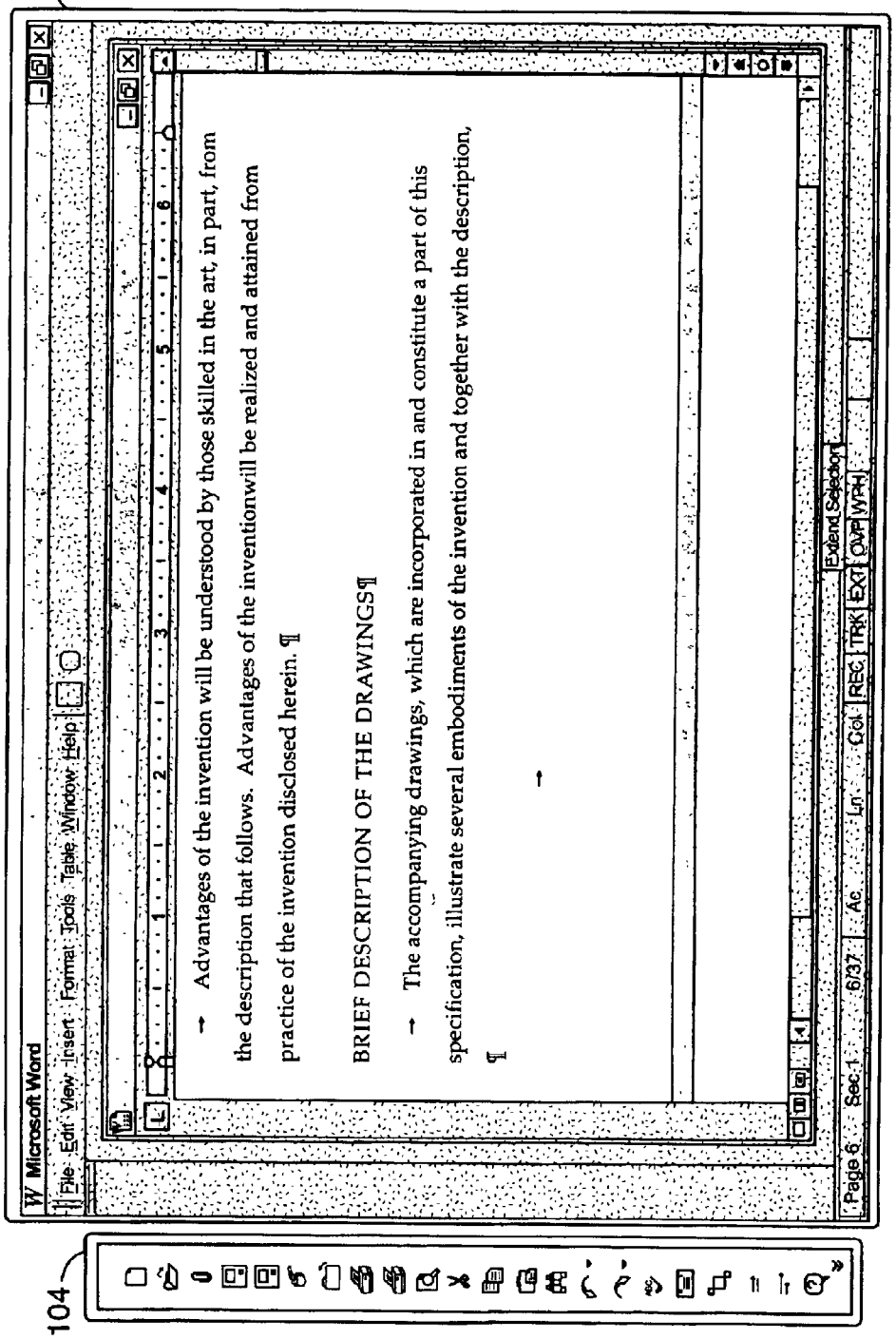
FIG. 3B shows the entire screen of FIG. 3A divided into sub-screens the energy needs of which are matched with displays under the control of the energy-aware software.
Figure 3B:

FIG. 3A provides another example of a visual presentation fashioned by an application that occupies the entire where the corresponding display (e.g., 102) is controlled in a normal mode (the energy-aware software control is deactivated). FIG. 3B, shows the entire screen of FIG. 3A divided into sub-screens that are allocated to corresponding displays 103 and 104 under the control of the energy-aware software. In this example, sub-screens containing the tool bars for the application and for the computing system are respectively diverted to smaller displays based on functionality and display parameters (size, color) that better match energy needs of the sub-screens. The sub-screen containing the "main" visual presentations fashioned by the application is designated for the larger color display 102. It is important to note again that the division into sub-screens as shown in FIG. 3B is merely exemplary and that the entire screen can be divided in other ways based on functionality or energy consideration.

Figure 4A:
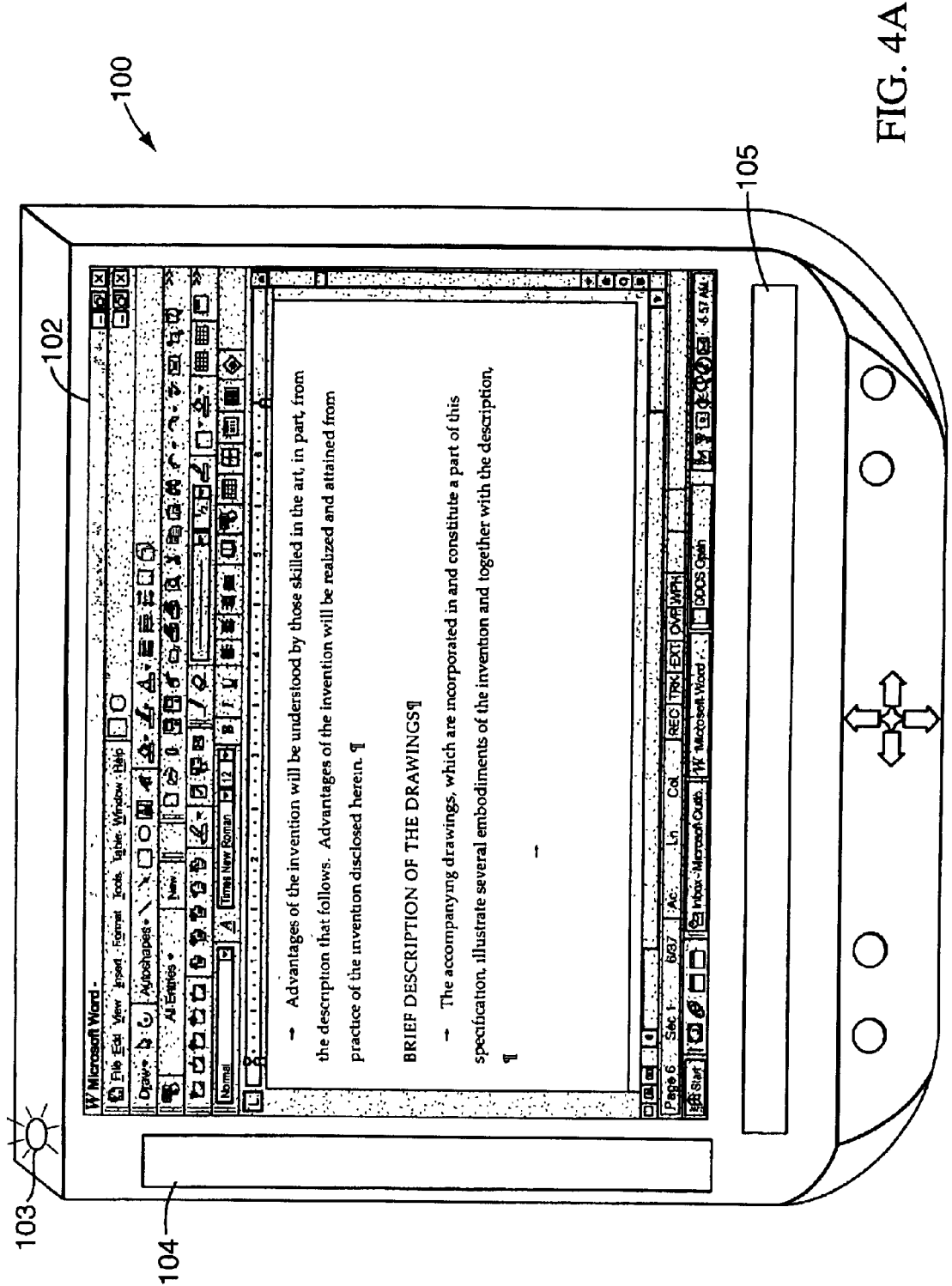
FIG. 4A shows a mobile computing system configured with multiple display with the energy aware software control deactivated.
Figure 4B:
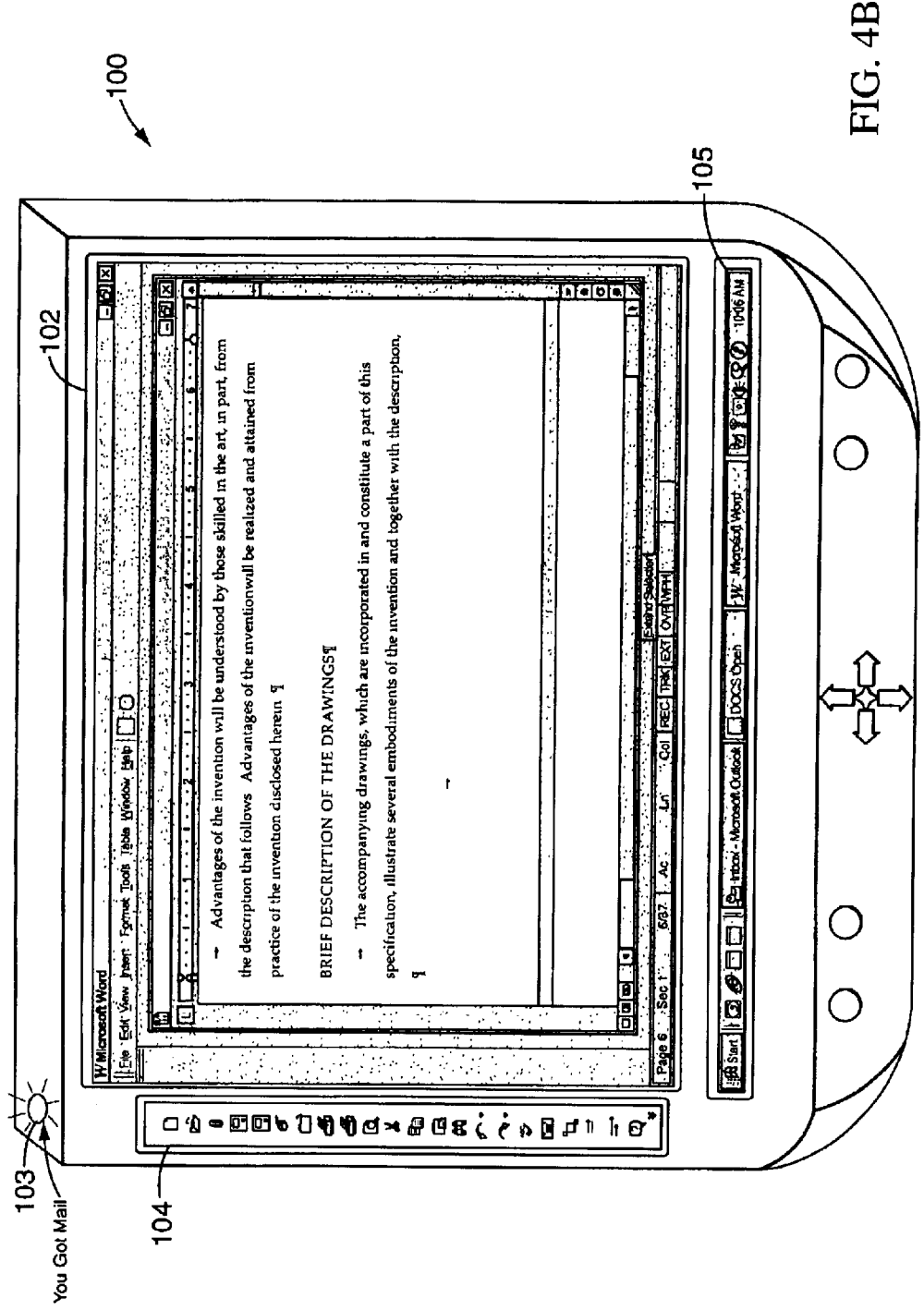
FIG. 4B shows the mobile computing system of FIG. 4A with the visual presentations controlled by the energy-aware software.

FIGS. 4A and 4B provide yet another example of visual presentations of an application with the energy-aware software control deactivated and activated, respectively. In this case, the mobile computing system 100 includes three displays (e.g., 102, 104, & 105) of varied properties and an indicator 103 such as an LED (light emitting diode) or another screen with suitable size and color properties for indicating short messages. As shown in FIG. 4A the entire screen is designated to display 102 when the energy-aware software control is not activated. In order to see whether there are any messages or the like, the screen of the application will have to be minimized in some way and room for the message will have to be made. When the application is terminated the entire display (102) will be dedicated to the short message(s). Both functionality and energy are compromised when the energy-aware software control is deactivated. Conversely, as shows in FIG. 4B, functionality and energy savings can be enhanced when the energy-aware software control is activated by the user or automatically by the mobile computing system (when a predetermined metric threshold is reached). Namely, the indicator 103 (an LED in this case) is illuminated when a message is waiting. Moreover, the entire screen is further divided and the energy needs of the sub-screens are matched with the corresponding displays (taking also functionality and other constraints into consideration).

As alluded to before, in implementing the energy-aware software control for producing the effects as shown for example in FIGS. 2B, 3B and 4B, its impact on the user experience is an important design consideration. From FIGS. 2B, 3B and 4B, one can visualize the impact that energy-aware software control and multiple displays can have on the user experience. Thus, although these particular examples do not appear to demonstrate an adverse impact on the user experience, such impact needs to be fairly non-intrusive in that it needs to be within the range of user tolerance. Indeed, experience with users suggests that the impact of energy-aware software control and multiple displays on the user experience could be fairly non-intrusive.

Notably, although the examples shown in FIGS. 2B, 3B and 4B focus mainly on functionality and size-based control, displays control based on a host of alternative metrics such as cost, power consumption, intensity, color, resolution, refresh rate, etc. is likewise possible. A decision on what particular metric (or metrics) should be involved in the control will be a function of the hardware constraints, intrusiveness level imposed by controlling a particular metric and the tolerance of the user to this intrusiveness (may be a function of battery life, personal preferences, etc.).

This is why the present invention targets systems with multiple displays of display technologies that support the control of multiple displays and interactions between them. Examples of such display technologies include LCD displays technology, organic light emitting diodes (OLEDs) technology, inorganic electroluminescent (EL) display technology, field emission display (FEDs) technology, CRT (cathode ray tube) technology, etc.

Preferably, the design of a system with the energy-aware software control starts with the aforementioned energy model. The energy-aware software control relies on the energy model in estimating the energy consumption (or savings) as a result of using the multiple displays and matching sub-screens with suitable displays and in determining the number and types of displays. The energy model is created by profiling display usage patterns for various applications running under typical deployment conditions. This model need not be very highly accurate but it should identify display usage and respective screen energy usage patterns at some high-level. For example, such a model may include information about the average screen area required for typical user interactions. The minimum levels of display attributes (resolution, contrast, readability, viewing angle, response time, luminous efficiency, lifetime, etc.) that can be tolerated without compromising the user experience may also be included in the energy model. Additional information in the energy model may include areas of the entire screen (i.e. possible subs-screens) that do not require full use of the display functionality (or attributes such as color, higher refresh rate, etc.) for long periods of time. These parameters can be combined with display-specific parameters characteristic to the power consumed by each of the displays (e.g., power as a function of technology type, size, resolution, brightness, color, and so on).

With the energy model, possible sub-screens of the entire screen can be determined on the basis of (i) heuristics derived from parameters in the energy model, (ii) user and/or application indications (hints) as to possible sub-screens and the manner in which they should be matched to displays, or (iii) dynamic observations of the parameters from the energy model. Whether heuristics or others, once developed they are coded into the application by the application developer as part of the energy-aware software control implementation. For the windows-based environment, heuristics can be coded into the windows-manager environment.

The heuristics are likely to vary depending on the nature of the software program. In some cases, like the windows-based environment, the allocation (or matching) of sub-screens can be directly correlated to a window of focus or other system parameter. In a computing system equipped with the aforementioned indicator or other suitable small display (either of which consuming less energy), a sub-screen associated with short messages (e.g., "you have mail") can be relegated to the indicator or small display. In this case, sub-screens containing visual presentations fashioned by data processing, search engine or like applications can stay on the large, color display (that consumes more energy). Other applications may require explicit user intervention in the form of directed cursor placement to identify the area of a sub-screen to be matched with a particular display. Namely, the user may have the option of selecting a sub-screen and a display for that sub-screen. A user-controlled option can be provided to turn off this energy-aware software control, if needed.

In choosing the displays for the system a number of choices are considered. These choices include but are not limited to the cost, size, power consumption, and quality (resolution in pixels per inch, contrast, readability, viewing angle, response time, luminous efficiency, lifetime, etc.). Some choices of displays for the system may include combinations of black and white display(s) and color display (s), large display(s) and relatively smaller display(s), high resolution display(s) and relatively lower resolution display (s), costly display(s) and relatively less costly display(s), and so on. Although, such features are typically used to ensure better quality of images and displays (better resolution, size, and pixel count), this invention uses them for energy-aware software control.

Figure 5A:
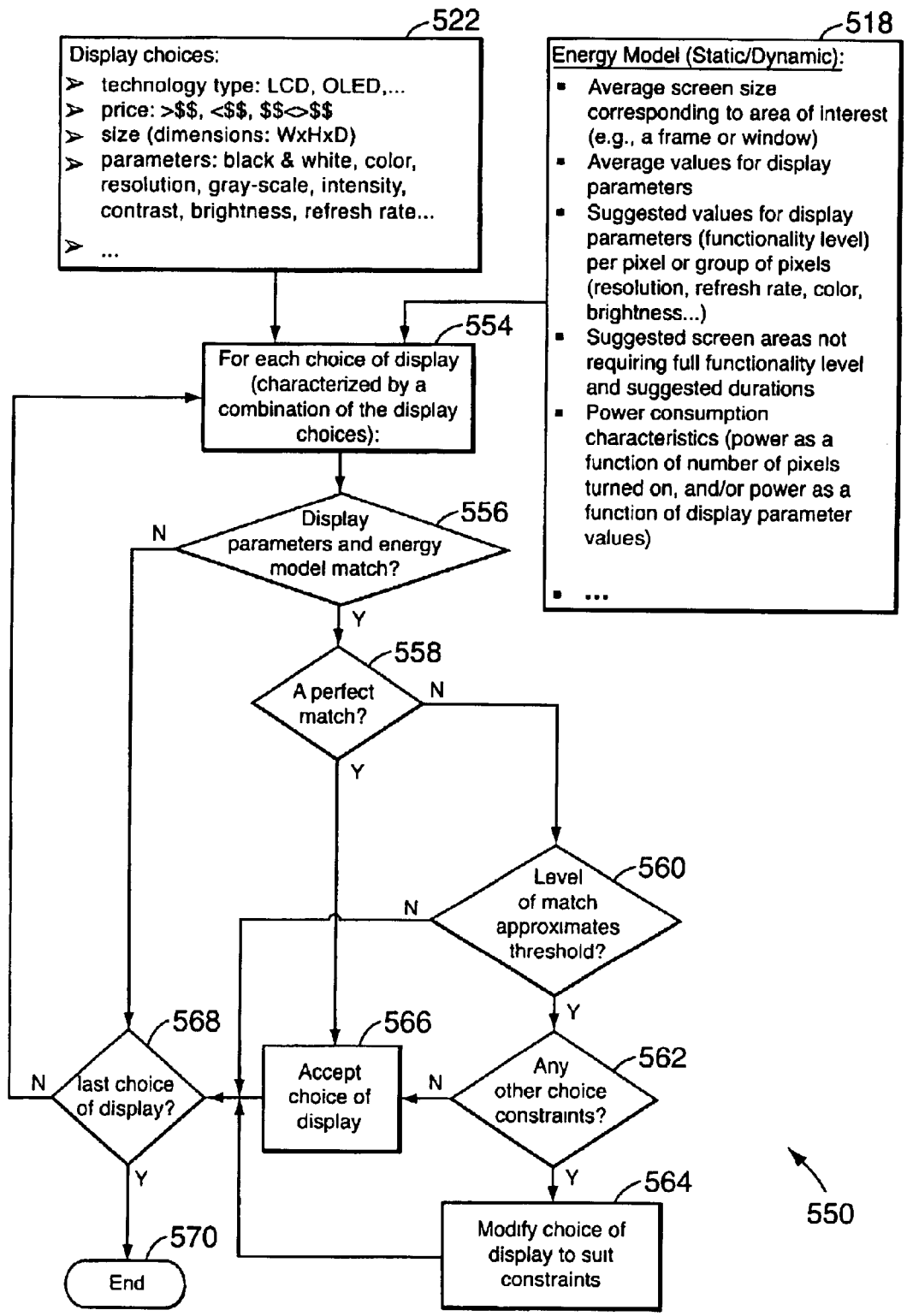
FIG. 5A is a design flow diagram for choosing display in systems configured in accordance with the present invention.

FIG. 5A illustrates the way displays can be chosen for implementing the present invention. Two important sets of information are used as inputs in this process. One set includes parameters of display choices 552, and the other set includes the parameters in the energy model 518. The energy model parameters include average screen size corresponding to area of interest, average values for display parameters, suggested values for display parameters, suggested screen area requiring full functionality, power attributes and so on. The parameters of display choices 552 include technology type (e.g., LCD, OLED, etc.), price or price range, size (width, height, and depth dimensions), parameters (black & white, color, gray-scale, high/low resolution, etc.).

Then, for each display choice, which is characterized by a combination of the parameters of display choices 552, a determination is made as to whether the display choice parameters match the energy model parameters 554. If the match is perfect 558, the choice of display is accepted 566. If the match is not perfect 558 and the level of match approximation is not within an acceptable threshold 560, the choice of display is rejected and the next display choice is considered (568, 554). If the level of match approximation is within the acceptable threshold 560 and no other choice constraints exist 562, the display choice is accepted 566. However, if the level of match approximation is within the accepted limits 560 but choice constraints do exist 562, the display choice is modified to suit the constraints 564. Once all the display choices have been analyzed in this fashion (568), the accepted displays choices are deemed suitable and can be used in implementing the system.

Figure 5B:
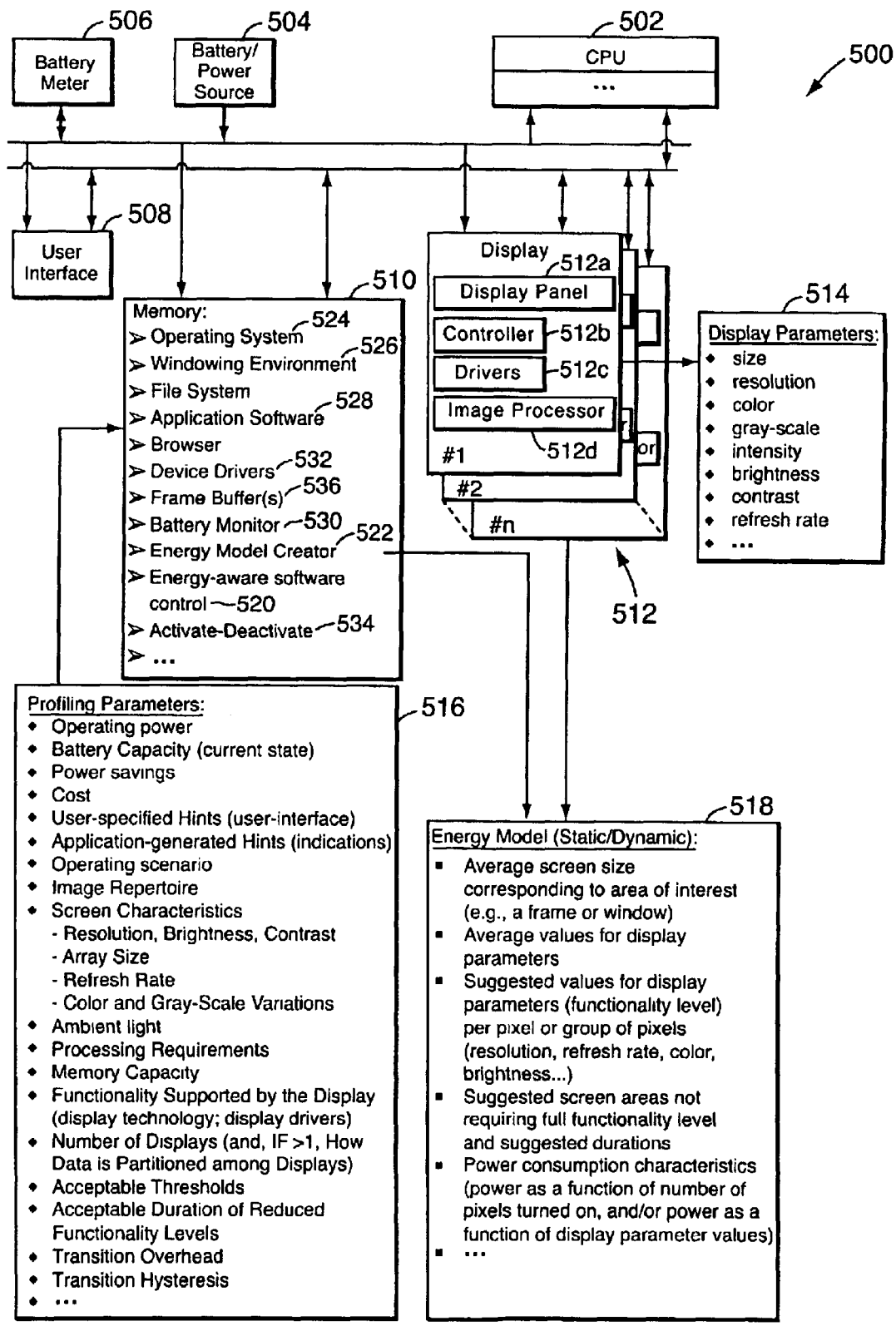
FIG. 5B is a block diagram of a system configured in accordance with the present invention.

Preferably, the energy-aware software control is designed to fit (i.e., designed for) the particular computer system and computing system environment in which it is to be embodied. An example of a computer system configured in accordance with the present invention is provided in FIG. 5B. In this example, the computer system 500 is battery powered 504, and an optional battery meter 506 can monitor the battery current. The system 504 is configured with two or more displays 512 of varied attributes and hardware/software modules in any combination for controlling and coordinating the multiple displays 512. The plurality of displays 512 are preferably selected in accordance with the process as illustrated in FIG. 5A. Each of the plurality of displays 512 is a subsystem that includes any combination of hardware and software modules associated with the visual representation of data in a computing system. As illustrated, each of the plurality of displays has a display panel (e.g., LCD, OLED, or a cathode ray tube—CRT) 512*a* and in addition it includes a display controller 512*b*, display drivers 512*c* and an image processing module 512*d* which correspond to the display panel technology. The image processing module 512*d* provides geometry and raster processing.

In one embodiment, a system with the foregoing displays may be further configured with an indicator that requires an LED or other display component and a suitable controller or device driver (not shown). As mentioned, this indicator can be useful for providing short messages in an energy efficient manner (and without interjecting such messages into the visual presentation of running applications). Furthermore, a system may include a motherboard (not shown) that can be fitted with sets of display controllers, device drivers, and image processing modules, at least one for each of the displays. Each display is controlled, in part, by controlling its parameters 514. Depending on the display technology and features, the displays can vary in cost and their parameters 514 can include size, number of tiles (if applicable), resolution, intensity, brightness, color, refresh rate, grayscale, ambient illumination, contrast, and so on, or any combination thereof.

Understandably, the computing system 500 includes a CPU 502. The CPU 502 fetches and executes program instructions stored in a computer readable medium such as the memory 510. For image control, the CPU has access to one or more frame buffers 536 that hold the image data of visual presentations to be displayed. The memory 510 embodies program code with instructions for causing the computing system 500 to perform various functions under CPU control. For example, the CPU 502 executes instructions in the battery monitor 530 to determine the state of the battery charge. Moreover, directly or indirectly, the CPU 502 controls each display of the plurality of displays 512 and the user interface 508.

Notably, the memory 510 embodies program code of the energy-aware software control 520. Although the energy-aware software control 520 is shown as a stand-alone feature in this computer system 500, it could be implemented at any layer of a system, including the operating system 524, windowing environment (if applicable) 526, applications 528 or firmware (not specifically shown). Moreover, although not shown as a separate entity, the energy-aware software control 520 in conjunction with the plurality of displays 512 include also means for controlling the plurality displays 512. In operation, the energy-aware software control determines, either automatically or with user intervention, when and how to use the multiple displays. To that end, the energy-aware software control employs the means provided for supporting control of the multiple displays.

Using a hardware and/or software mechanism (not shown), the energy-aware software control 520 tracks the contents of the frame buffer(s) 536. The contents of the frame buffer(s) 536 supplements or stands in for visual presentation information created by the operating system 524 and any application 528 that runs under its control. The operating system 524 and any running application(s) 528 are able to inform the energy-aware software control 520 about the type of visual presentation(s) fashioned for display. And, by tracking the frame buffer(s)' contents the energy-aware software control is able to determine not only the type of visual image(s) being displayed but which visual image is active at any point in time. An active visual image is a candidate for energy-aware treatment as will be further explained with reference to FIG. 6. For example, consider a computing system with a time display feature and a short message feature, both of which being of the type that requires small, low-resolution monochromatic display. In this example, consider also that the time display feature is an active visual image that changes regularly every second, and that the short message feature is active whenever a short message is received. By learning of such active visual images and considering functional and energy factors the energy-aware software control 520 determines how to divide the entire screen and to which display the sub-screens should be sent. Under the control of the energy-aware software 520 in the exemplary system, when active, the time display and short message are put into sub-screens selected for display on a small monochromatic display.

Moreover, a mechanism is preferably provided to allow activation and deactivation, manually or automatically, of the energy-aware software control 520. Using a hardware/software combination that can be operatively connected to the user interface 508 and includes an activate-deactivate program code 534, the mechanism can activate and deactivate the energy-aware software control automatically based on predetermined criteria or by user intervention.

As mentioned before, the energy-aware software control 520 uses the energy model 518 in determining sub-screens (be it windows or otherwise). To that end, the energy model creator 522 creates the energy model 518 based on profiling parameters 516 that it uses as its input. Although the energy model creator 522 is shown as a separate feature it could be implemented as part of the energy-aware software control 520. Likewise, the battery monitor could be implemented as an integral part of the energy-aware software control 520.

The profiling parameters 516 for creating the energy model depend on the computer system, computing environment and displays. Examples of profiling parameters include, but are not limited to, operating power, battery capacity (current state), power savings, cost, user-specified hints (user-interface), application-generated hints (indications), operating scenario, image repertoire, sub-screen characteristics (display parameters such as resolution, brightness, contrast, array size, refresh rate, color and grayscale variations), ambient light, processing requirements, memory capacity, functionality supported by the display (display technology and display drivers), number of displays (and, if >1, how data is partitioned among displays), acceptable thresholds, acceptable duration of reduced functionality levels, functionality level transition overhead, and transition hysteresis.

Depending on the system configuration, the energy model creator 522 uses any combination of these profiling parameters 516 for creating the static and/or dynamic energy model 518. As specified before, the energy model 518 includes, but is not limited to, information about the average sub-screen area used by contents in the area of interest (e.g., a frame or window of focus), the average sub-screen area used by contents of peripheral interest (e.g., other windows or background), suggested values for display parameters (functionality level) per pixel or group of pixels (resolution, refresh rate, color, brightness . . . ), suggested sub-screen areas not requiring full functionality level and suggested duration, power consumption characteristics (power as a function of number of pixels turned on, and/or power as a function of display parameter values).

The design of computing systems as described above involves a number of additional considerations affecting the hardware design and the energy-aware software control design. For example, modules for implementing hardware and software functionality are interchangeable and any suitable combination thereof is possible based on considerations of processing speed, ease of design, cost, system dimensions, etc. As a further example, the energy-aware software control can be implemented as an aggregation or integration of software modules. One or more software modules can be directed to addressing the screen partitioning and sub-screens tradeoffs and interactions. Other software modules can be directed to the energy-aware control of individual displays among the plurality of displays. It is envisioned that the first and second sets of these software modules will interact with each other so that the energy-aware control can be well coordinated.

It is further envisioned that several layers of the software system (or computing environment) may be involved in the software control of each of the displays, singly or in combination. Thus, as a further design consideration, since software development will have to be made, it is necessary to decide at what layer of that software it will be made. Energy-aware software-control development can be made for example at the operating system layer, at the windows manager level (if applicable), at the applications layer, or at the firmware layer that interacts with display hardware (device drivers, etc.). In a windows-based environment, for example, the software implementation may involve changes at two layers: (i) the software drivers that control the multiple displays, and (ii) the windows-based environment that interfaces to the display device drivers. For displays that meet the requirements outlined above, providing a simple interface to control sub-screens in the windowing environment may involve handles to the various windows and matching the windows with proper displays. It is contemplated that in future system implementations these levels of energy-aware software-control will be used in conjunction with one another.

In whatever computing environment the invention is implemented, it is important to consider certain aspects of the energy-aware software control design. One design aspect is identifying heuristics based on which the number and types of displays can be determined. The heuristics, from which the aforementioned energy model can be derived, are identified for various parameters and various display usage patterns for various applications. Another design aspect is identifying possible sub-screens and their corresponding properties. Yet another design aspect is identifying possible matches between the sub-screens and displays and selecting the closest matches among them while minimizing intrusiveness of the impact on the user experience. Hence, implementation of the energy-aware software control in any computing environment involves determining first the display usage patterns for typical users.

The software development further involves the decision on when and how the energy-aware software control will be activated automatically. The feature associated with activation and deactivation of the energy-aware software control can be designed based on the heuristics and metrics of the system. For example, when the battery current can be monitored, the energy-aware software control can be automatically correlated to the monitored battery current. Alternatively, the energy-aware software control of the display may be prompted by user intervention. In laptop computers with the windows-based environment, a combined solution may be preferred. This solution will allow automatic prompting of the energy-aware software control when the battery goes below a threshold value (e.g., 15%) of its total capacity, with the added functionality the lets the user to turn on/off this feature at any time.

Figure 6:
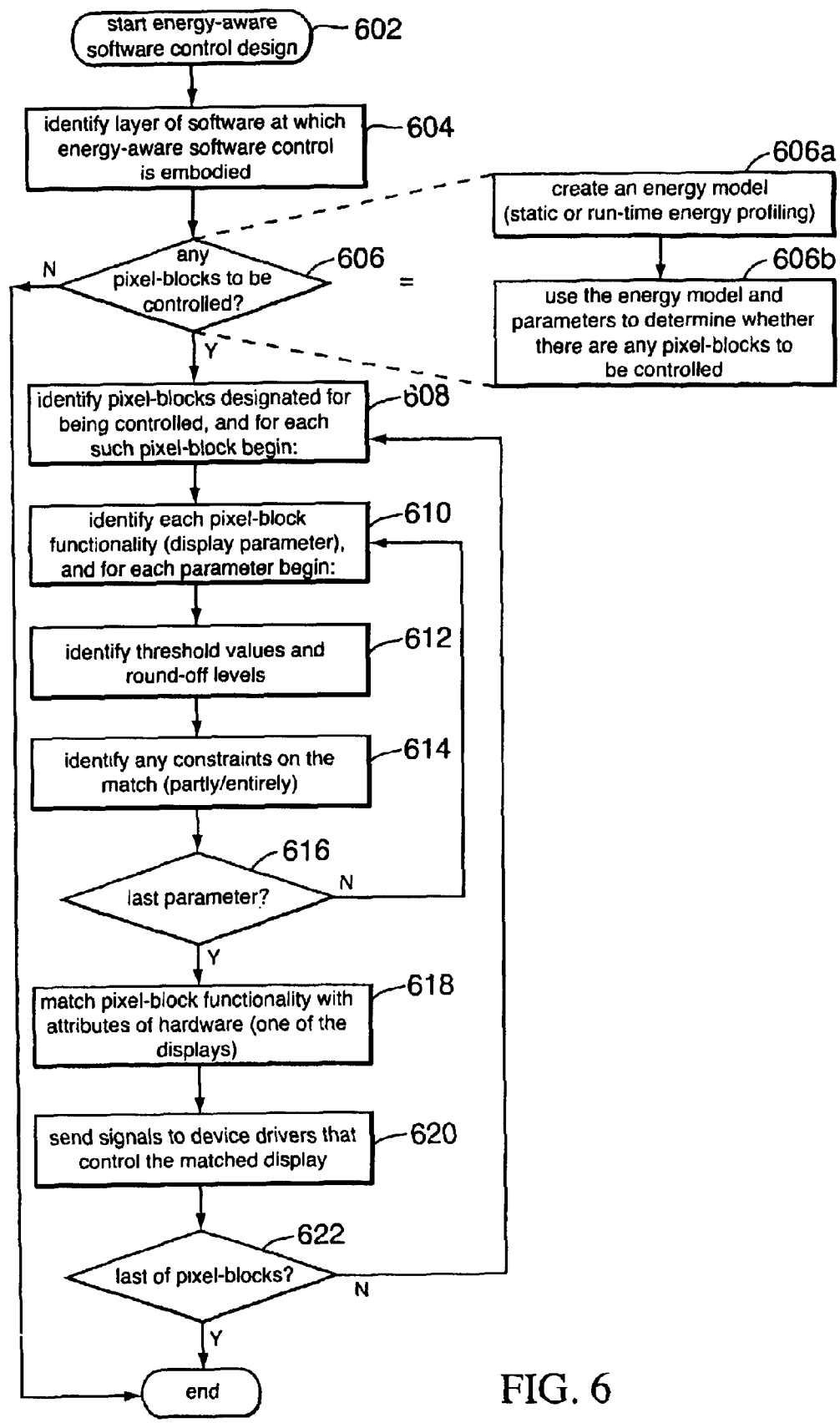
FIG. 6 is a flow diagram illustrating the energy-aware software control design elements.
Figure 7A:
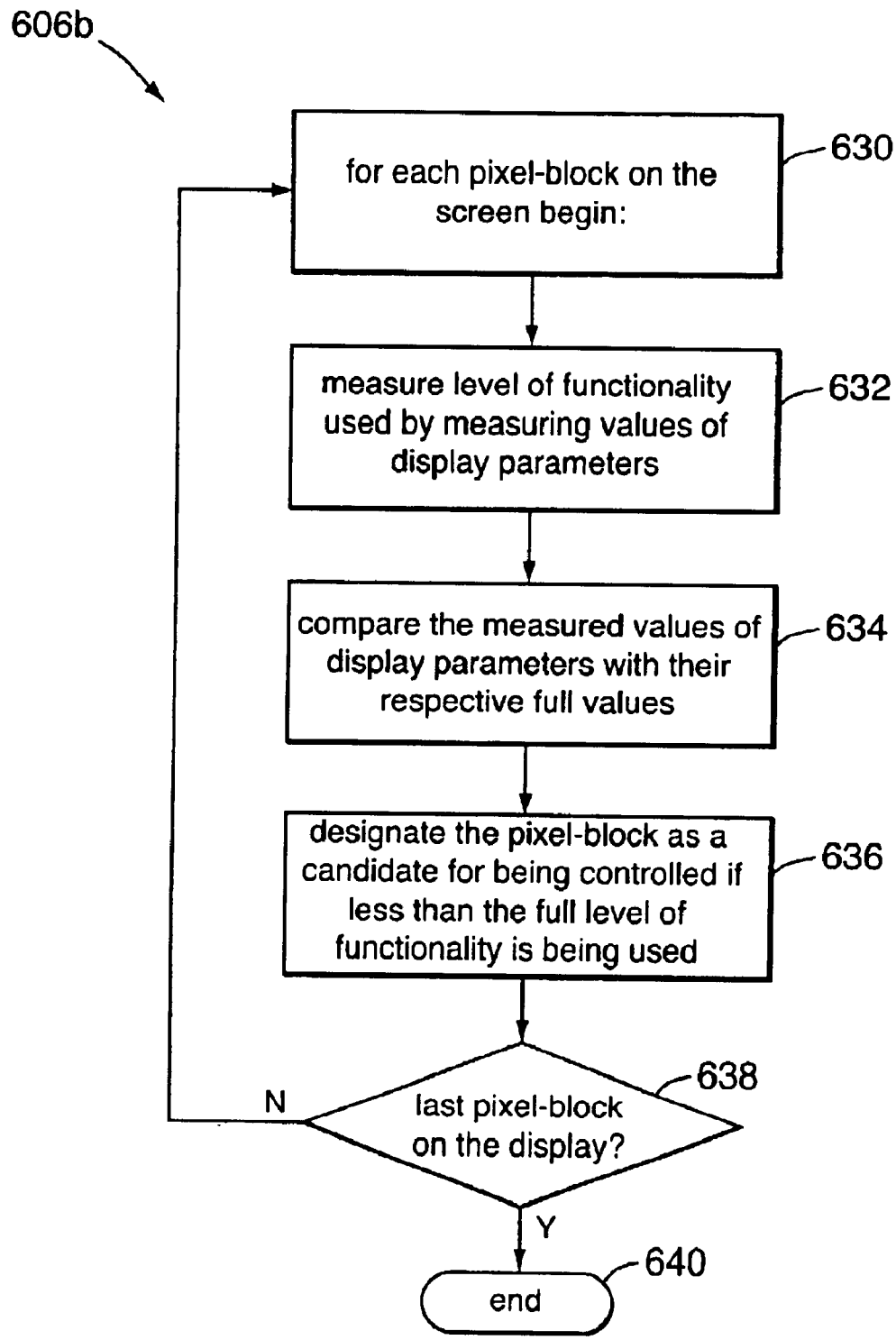
FIGS. 7A and 7B are flow diagrams that illustrate ways for identifying candidate pixel-blocks to be controlled.
Figure 7B:
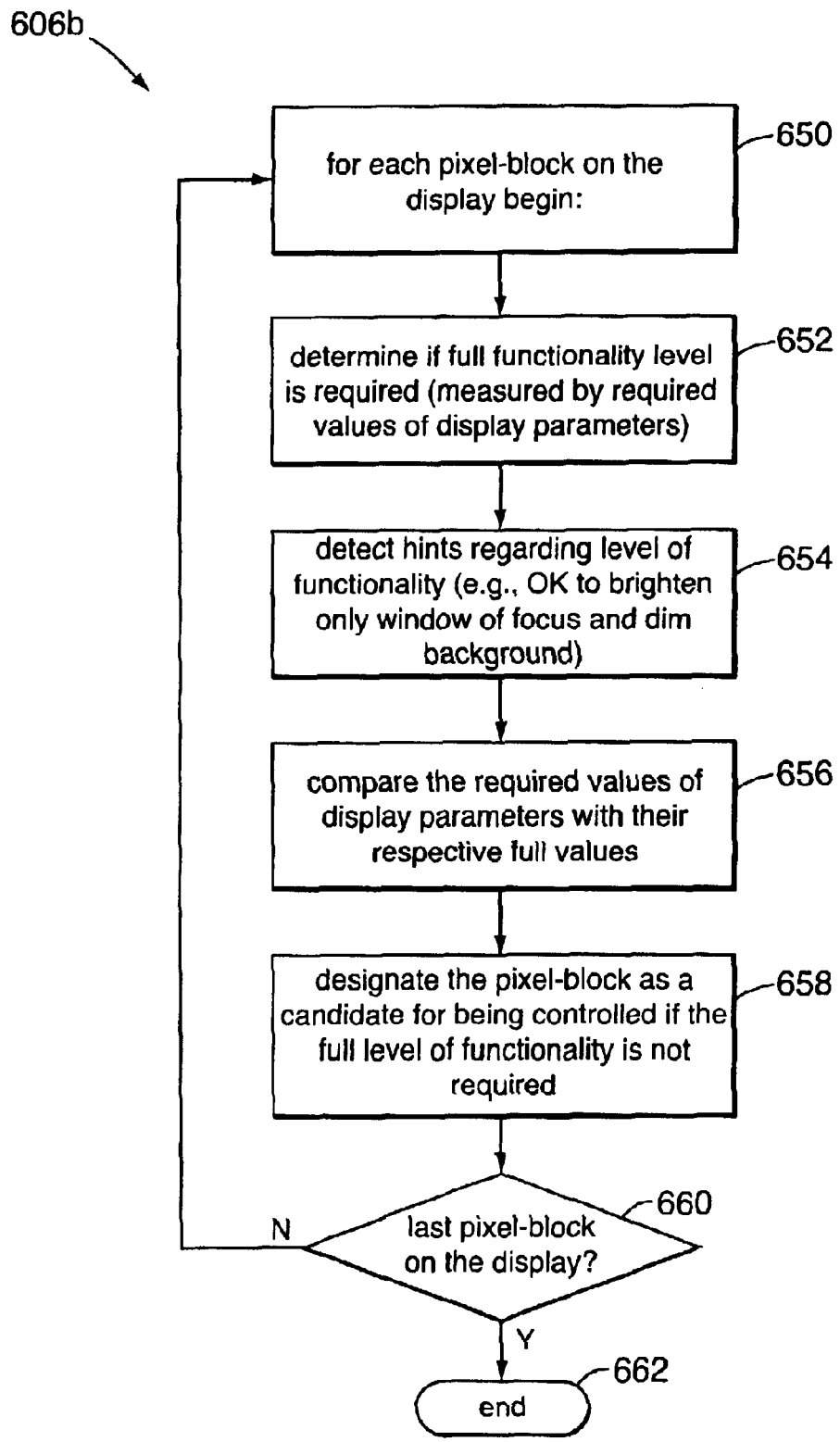

FIGS. 6, 7A and 7B are flow diagrams illustrating the design elements of the energy-aware software control. Once the layer of software at which the energy-aware software control is intended to operate is identified, 604, the energy-aware software control is embodied in that layer. As specified before, examples of the layers of software include the operating system layer, the windows environment manager layer, the application layer or the firmware layer. A determination is then made as to which pixel-blocks need to be controlled 606. A pixel-block is akin to a sub-screen of the entire screen. As mentioned in the description above of FIG. 5 with reference to the operating system, running application(s) and frame buffer(s), a determination about the division into sub-screens is based, at least in part, on the type and in/active state of the visual image(s). Accordingly, sub-screens that are candidates for energy-aware treatment are ascertained and a decision is made as to which of them should be controlled. Control of the pixel-blocks involves for example decisions on which pixel-blocks of the entire screen may require energy-aware consideration and should be matched with low-energy-consuming displays. Correspondingly, consideration of functionality requirements influences decisions as to which pixel-blocks are to be matched with displays that satisfy such requirements, be it high-energy-consuming display or otherwise (e.g., some sub-screens contain visual presentations the require relatively larger high resolution, color displays).

Based on the aforementioned energy model and heuristics of display parameters derived from that model, the pixel-blocks to be controlled are identified for each of the displays 606*b*. There are a number of ways for identifying candidate pixels, two of which are described in FIGS. 7A and 7B, respectively.

Turning to FIG. 7A to illustrate one of the ways, for each pixel-block (sub-screen) a process of determining if it should be marked for control begins at step 630. In this example, for each such pixel-block the process includes determining the level of functionality used by measuring value(s) of display parameter(s) associated with that pixel-block (step 632). Then, the measured parameter value or values are compared with their respective value for a full functionality level (i.e., maximum value) at step 634. The foregoing values are associated with the display parameter heuristics that are derived from the aforementioned energy model. That pixel-block is marked as a candidate for control if the measured values are lower than the maximum values of its parameters (step 636). The process repeats if that pixel-block (sub-screen) is not the last to be examined (step 638).

Turning to FIG. 7B to illustrate another way, for each pixel-block (sub-screen) the process of determining if it should be marked for control begins at step 640. In this example, for each such pixel-block the process includes determining if a full level of functionality is required by examining the required value(s) of display parameter(s) associated with that pixel-block (step 642). Again, such values are derived from the energy model. Additionally, various hints (user or application generated hints as mentioned in the discussion above) that qualify the required level of functionality (also factored in the energy model) are detected (step 644). Then, the required (and, if applicable, qualified) parameter value or values are compared with their respective value for a full functionality level (i.e., maximum value) at step 646. That pixel-block is marked as a candidate for control if the required values are lower than the maximum values of its parameters (step 648). The process repeats if that pixel-block (sub-screen) is not the last to be examined (step 638).

Returning to FIG. 6, after the pixel-blocks to be controlled had been marked, and out of the marked pixel-blocks in the entire screen there are pixel-blocks remaining to be controlled (step 606), for each remaining marked pixel-block the process begins at step 608. For that pixel-block, the display parameters (functionality) are identified in step 610. The display parameters may include ambient illumination, color, gray-scale, brightness, contrast, array size, refresh rate, etc. For each parameter the process determines the threshold value and round-off levels in step 612. Acceptable thresholds provide energy savings while providing the needed functionality. Next, constraints on pixel-block parameters' control are identified (step 614). Examples of such constraints include loss of user interface functionality, loss in performance due to overhead in transition between functionality levels, time constraints and hardware constraints. This process repeats for each of the parameters (616). Having considered all the parameters, thresholds, constraints and hints, a match can be found between the available hardware (display) and the pixel-block 618. Then, in order to put on view the marked sub-screen, control signals can be sent to display drivers of the suitable (matched) display for controlling that display (step 620). This process repeats for each the marked pixel-blocks (622).

To sum up, the present invention proposes changing display usage patterns. To that end, the invention contemplates using an energy-aware software control in conjunction with a plurality of displays of varied attributes. It is envisioned that an approximate match can be found between the energy and functionality needs of sub-screens and the attributes of available displays. The energy-aware software control is designed to control and coordinate sub-screens tradeoffs and interactions. To implement the proposed software control, the present invention targets systems with display technology that supports multiple displays control. This approach is intended to provide a practicable and compelling energy conservation and, along the way, extended battery life or reduced consumption of electricity.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A method for energy-aware software control in a computer system on which one or more applications are running and fashioning a screen, comprising:
    establishing in the computer system a display configuration of a plurality of displays, at least two of the displays having varied attributes;
    profiling screen usage patterns and their impact on energy consumption by the computer system, the profiling resulting in an energy model; and
    determining when to activate the energy-aware software control, wherein the energy-aware software control involves dividing up the screen into sub-screens and matching energy and functionality needs associated with the sub-screens to the plurality of displays based on their respective attributes and the energy model.

2. The method of claim 1, wherein the energy-aware software control affects reduction in energy consumed by the computer system and improves its performance.

3. The method of claim 1, wherein, respectively, the sub-screens are put on view by displays that more approximately match the energy and functionality needs associated with the sub-screens.

4. The method of claim 1, wherein the energy and functionality needs associated with the sub-screens correspond, respectively, to the one or more applications.

5. The method of claim 1, wherein the energy-aware software control coordinates sub-screen interactions and tradeoffs as predefined in the computer system or as selected by a user of the computer system.

6. The method of claim 1, wherein the energy-aware software control modifies display usage patterns.

7. The method of claim 1 wherein the computer system is a mobile computing system.

8. The method of claim 1, wherein the energy-aware software control is designed to accommodate user preferences and to render its impact less intrusive on a user experience.

9. The method of claim 1, wherein the computer system includes a plurality of layers that define its computing environment, and wherein the energy-aware software control is functioning at a particular layer of the computing environment, that layer being an operating system layer, an applications layer, a firmware layer, or, if the computing environment is a windowing environment, a windows manager layer, or any combination thereof.

10. The method of claim 1, wherein the screen is partitioned dynamically, the sub-screens being dynamic segments of the screen.

11. The method of claim 1, wherein the energy model is created dynamically.

12. The method of claim 1, wherein the energy model is created by profiling display usage patterns for various applications under typical deployment conditions.

13. The method of claim 1, wherein the energy model contains data including screen areas that do not require full use of the display functionality for long time periods.

14. The method of claim 1, wherein sub-screens can be determined on the basis of heuristics derived from parameters in the energy model, user hints or application-controlled indications, or dynamic observations of the parameters from the energy model.

15. The method of claim 14, wherein the heuristics can vary with applications.

16. The method of claim 14, wherein the heuristics can be embodied in applications.

17. The method of claim 1, wherein, in a windows-based computing environment of the computer, system the sub-screens can be correlated to windows.

18. The method of claim 1, wherein the sub-screens can be correlated to visual presentation frames.

19. The method of claim 1, wherein the sub-screens can be correlated to cursor positions or icons.

20. The method of claim 1, wherein the energy-aware software control is prompted to provide either automatic control of the displays based on monitored metrics or user-initiated control.

21. The method of claim 20, wherein the monitored metrics include battery current.

22. The method of claim 1, wherein the energy-aware software control can be selectively or entirely turned on or off, by a user of the computer system.

23. The method of claim 1, wherein the energy-aware software control marks portions of the screen to define the sub-screens, and wherein the portions are blocks of pixels.

24. The method of claim 23, wherein the pixel-blocks are marked based on a respective comparison between their required or measured level of display parameters and their maximum level of display parameters, such that a pixel-block is a candidate for control if its required or measured level is lower than its maximum level.

25. A method for configuring a system with a plurality of displays that can support energy-aware software control, comprising:

profiling screen usage patterns and their impact on energy consumption, the profiling resulting in an energy model; and choosing the number and types of displays for the system based on the energy model and possible display choices, each of the possible display choices being characterized by display parameters, at least two of the displays being chosen to have diverse attributes, each of the possible display choices being considered by determining whether there is a match and a level of the match between energy and functionality needs of possible sub-screens and the parameters of that display choice, a possible display choice being accepted if the level of match is deemed within a threshold, the plurality of displays being selected from among the accepted possible display choices.

26. The method of claim 25, wherein the level of match is a perfect match or a close approximation that fits within limits defined by the threshold.

27. The method of claim 25, wherein the display parameters include cost, size, power attributes, and quality.

28. A method for energy-aware software control in a computer system on which one or more applications run and fashion a screen, comprising:

establishing in the computer system a display configuration of two or more displays of which at least two have varied attributes;

profiling screen usage patterns and their impact on energy consumption, the profiling resulting in an energy model;

identifying pixel-blocks of the screen to be controlled based on considerations of functionality and energy needs derived from the energy model;

marking the pixel-blocks to be controlled;

matching, respectively, the functionality and energy needs of the marked pixel-blocks to the displays based on their attributes; and putting the pixel-blocks on view by matched displays.

29. The method of claim 28, wherein the computer system includes layers that define its computing environment, the method further comprising:

establishing a layer of the computing environment at which the energy-aware software control will function.

30. The method of claim 28, wherein the pixel-blocks are identified by comparing their measured or required energy needs with their maximum possible energy needs, wherein pixel-blocks are candidates for being controlled if their measured or required energy needs are lower than their maximum possible energy needs.

31. The method of claim 28, wherein the energy needs can be correlated to any combination of color range, gray-scale, intensity, contrast, user hints, application-controlled indications, heuristics derived from parameters in the energy model, and dynamic observations of the parameters from the energy model.

32. A system for energy-aware software control in a computer system, comprising:

a plurality of displays, at least two of the displays having varied attributes;

means for profiling screen usage patterns and their impact on energy consumption by the computer system, the profiling resulting in an energy model;

means for energy-aware software control configured with means for dividing up the screen into sub-screens and matching energy and functionality needs associated with the sub-screens to the plurality of displays based on their respective attributes and the energy model; and means for determining when to activate the energy-aware software control means.

33. The system of claim 32, wherein the energy-aware software control means affects reduction in energy consumed by the computer system and improves its performance.

34. The system of claim 32, wherein, respectively, the sub-screens are put on view by displays that more approximately match the energy and functionality needs associated with the sub-screens.

35. The system of claim 32, wherein each of the displays is configured with display technology that includes any one of liquid crystal display technology, an organic light emitting diode technology, inorganic electroluminescent (EL) display technology, field emission display technology, multi-tiled display technology and CRT technology.

36. The system of claim 32, further comprising:

a frame buffer accessible by the energy-aware software control means for tracking its contents and learning therefrom a type and a state of visual images, wherein the type and state of visual images factor in the dividing into and the matching of the sub-screens.

37. A system for energy-aware software control, the system being powered by a power source and providing a platform for running programs that fashion a screen, the system comprising:

a plurality of displays, at least two of the displays having varied attributes;

a user interface;

a monitor configured to monitor power metrics of the power source;

an energy model creator using as an input profiling parameters to create an energy model;

means for providing energy-aware software control configured with means for dividing up the screen into sub-screens and matching energy and functionality needs associated with the sub-screens to the plurality of displays based on their respective attributes and the energy model; and means for activating and deactivating the energy-aware software control, including based on indications from the monitor, the applications and/or the user interface.

38. The system of claim 37, further comprising:

means for allowing a user to turn the energy-aware software control on/off via the user interface.

39. The system of claim 37, further comprising:

means for selectively or fully turning the energy-aware software control on/off.

40. The system of claim 37, further comprising:

means for controlling the plurality of displays operatively associated with display drivers, display controllers and image processors.

41. The system of claim 37, wherein the means for providing the energy-aware software control is implemented as an aggregation or integration of software modules, one or more of the software modules being directed to addressing the screen partitioning and sub-screens tradeoffs and interactions.

42. The system of claim 41, wherein the software modules interact with each other.

43. The system of claim 37, wherein each of the plurality of displays, the user interface, the monitor, the energy model creator, the means for providing the energy-aware software control and the means for activating and deactivating the energy-aware software control, can be configured with any combination of hardware and software modules.

44. The system of claim 37, wherein the power source is a battery and wherein the indication from the monitor is an energy state of the battery.

45. The system of claim 37, further comprising:

activity time monitor accessible by the means for activating and deactivating the energy-aware software control so as to prompt activation/deactivation after a predetermined period of inactivity/activity of the energy-aware software control.

* * * * *

UNITED STATES PATENT AND TRADEMARK OFFICE
CERTIFICATE OF CORRECTION

PATENT NO. : 6,912,664 B2 Page 1 of 1
APPLICATION NO. : 10/081720
DATED : June 28, 2005
INVENTOR(S) : Parthasarathy Ranganathan et al.

It is certified that error appears in the above-identified patent and that said Letters Patent is hereby corrected as shown below:

In column 20, line 31, in Claim 7, delete "claim 1" and insert -- claim 1, --, therefor.

In column 22, line 33, in Claim 35, after "display" insert -- (LCD) --.

In column 22, line 34, in Claim 35, after "diode" insert -- (OLED) --.

In column 22, line 36, in Claim 35, after "CRT" insert -- (cathode ray tube) --.

Signed and Sealed this

Fifteenth Day of September, 2009

David J. Kappos
*Director of the United States Patent and Trademark Office*